No. 871,928. PATENTED NOV. 26, 1907.
H. J. GILBERT.
BUSHING.
APPLICATION FILED FEB. 8, 1904.
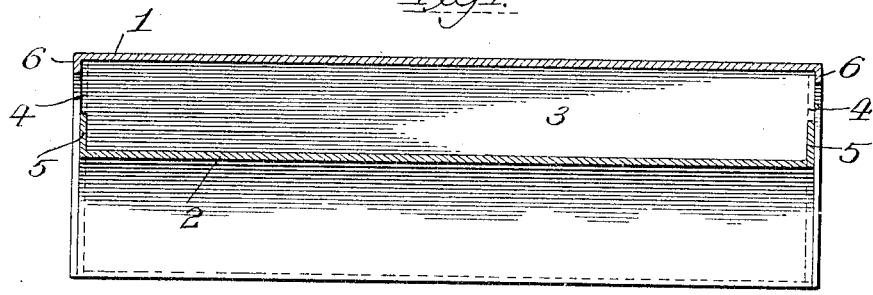
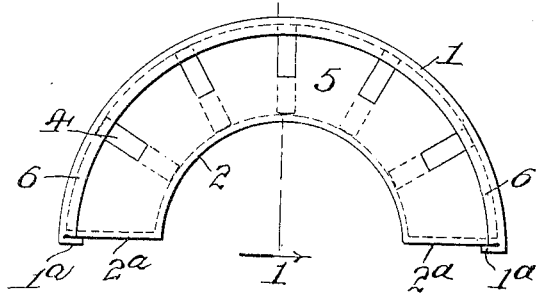
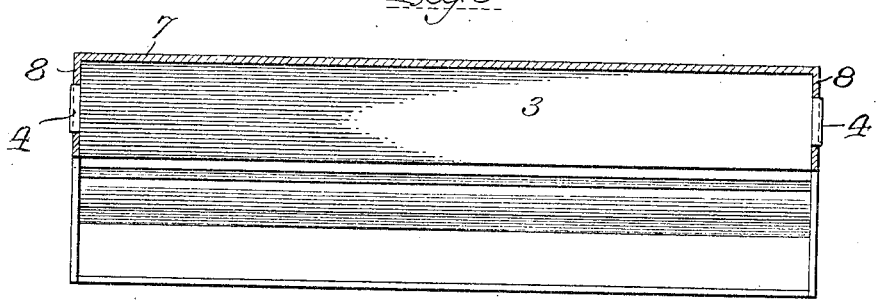
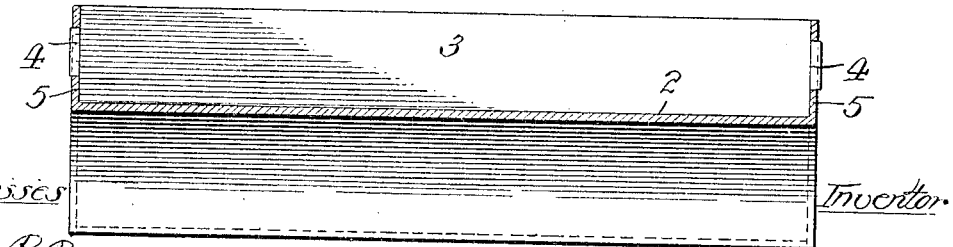
Witnesses
Edw. R. Barrett
Lita S. Alter
Inventor
Henry J. Gilbert
By Rector & Hibben Attorneys
THE NORRIS PETERS CO., WASHINGTON, D. C.

UNITED STATES PATENT OFFICE.

HENRY J. GILBERT, OF SAGINAW, MICHIGAN.

BUSHING.

No. 871,928.  Specification of Letters Patent.  Patented Nov. 26, 1907.

Application filed February 8, 1904. Serial No. 192,702.

*To all whom it may concern:*

Be it known that I, HENRY J. GILBERT, a citizen of the United States, residing at Saginaw, in the county of Saginaw and State of Michigan, have invented certain new and useful Improvements in Bushings, of which the following is a description.

My invention pertains to bushings employed for various purposes, as for instance in connection with pulleys and the like wherein are used interchangeable bushings to enable any size of pulley having a given shaft bore or opening, which is generally of standard diameter, to be inserted and clamped upon a shaft of any diameter less than such bore, and the object of my invention is to produce a simple and reliable bushing of this character, and one comparatively inexpensive, and light as well as durable and efficient.

In the accompanying drawing, Figure 1 is a central longitudinal section of one of the halves of a bushing suitable for a pulley of the split type, the section being taken on line 1—1 of Fig. 2; Fig. 2 an end elevation of such half bushing; Fig. 3 a central longitudinal section of a half bushing with the inner sleeve omitted; and Fig. 4 a similar section of a half bushing with the outer shell omitted.

Inasmuch as my bushing finds useful application to pulleys of the split type, I will describe the same in connection therewith and consequently the bushing will partake of the same split character, but it will be understood that my bushing may be made entire, that is in one piece, in which condition it may be advantageously employed for loose pulleys.

Referring to Figs. 1 and 2, the half bushing therein shown comprises essentially an outer shell 1, semi-circular in cross-section, an inner shell or sleeve 2 concentric to the outer shell, and a series of bars or strips 3 arranged between the shells and connected to one of such shells, the disks being preferably parallel to each other and to the bushing axis and to the axis of rotation. In this particular instance, the outer shell constitutes the outer bearing surface and the inner shell the inner bearing surface adapted to contact the shaft to which the pulley or the like is to be applied. The bars or strips, by preference, are flat and produced from suitable sheet metal. As herein shown, the ends of these strips are provided with projecting lugs 4 which are adapted to engage and interlock with the upturned semi-annular flanges 5 extending outwardly from the ends of the inner shell or sleeve 2. By preference, these lugs are riveted down upon the flanges 5 to securely hold the parts together. The outer shell is preferably provided with inwardly directed end flanges 6 which engage or lap over the upturned flange 5 of the sleeve 2. The material of the shell 1 is greater than necessary to form substantially a semi-circle in cross-section in order to provide for inwardly directed flanges 1ª upon which rest outwardly directed radial flanges 2ª of the sleeve 2.

In Fig. 3 is shown a modification in which the sleeve is dispensed with and the inner edges of the strips constitute the inner bearing surfaces. In this construction the ends of the outer shell 7 are provided with inwardly directed flanges 8 provided with openings or slots to receive the projecting lugs 4 of the bars 3 and thereby interlock therewith.

In Fig. 4 is shown a structure of bushing in which the outer shell is dispensed with and the outer edges of the strips constitute the outer bearing surfaces. In other respects it is the same as the structure of the bushing of Fig. 1.

Various modifications and changes may obviously be made in the structures shown without departing from the spirit and scope of my invention.

I claim:

1. A bushing comprising a rigid shell, and a series of bars or strips connected therewith and arranged longitudinally thereof, said strips being separate from each other; substantially as described.

2. A bushing comprising a non-flexible shell, a series of substantially parallel and independent bars or strips arranged longitudinally thereof, and means for securing such strips to the shell, said shell and strips being arranged at different radial distances from the bushing axis; substantially as described.

3. A bushing comprising a shell, a series of substantially parallel strips arranged longitudinally thereof and separate from each other, and means for spacing or distancing such strips; substantially as described.

4. A bushing comprising a shell, a series of substantially parallel strips arranged longitudinally thereof and separate from each other, and means for securing such strips to the shell and for distancing or spacing them with respect to each other; substantially as described.

5. A bushing comprising a shell arranged to have no bearing on a shaft, and a series of strips having interlocking connection therewith; substantially as described.

6. A bushing comprising a rigid shell, and a series of strips arranged longitudinally thereof and connected thereto at their ends, said strips being separate from each other; substantially as described.

7. A bushing comprising a shell arranged to have no bearing on a shaft, and a series of strips arranged longitudinally thereof and having interlocking connection therewith as to their ends; substantially as described.

8. A bushing comprising a shell having flanges, and a series of strips arranged longitudinally thereof and connected to said flanges; substantially as described.

9. A bushing comprising a shell having end flanges, and a series of strips arranged longitudinally thereof and having at their ends interlocking connection with said flanges; substantially as described.

10. A bushing comprising a shell having flanges, and a series of strips arranged longitudinally thereof, and provided with projecting end lugs, said flanges having a series of openings to receive said lugs; substantially as described.

11. A bushing comprising two concentric shells, and a series of bars or strips disposed longitudinally of the bushing axis and arranged between such shells; substantially as described.

12. A bushing comprising two concentric shells, and a series of strips disposed radially and longitudinally of the bushing axis and arranged between such shells; substantially as described.

13. A bushing comprising two concentric shells, and a series of strips disposed longitudinally of the bushing axis and having interlocking connection with one of said shells; substantially as described.

14. A bushing comprising two concentric sheet metal shells, and a series of flat sheet metal strips disposed radially and longitudinally of the bushing axis, there being means for securing and spacing such strips between such shells; substantially as described.

15. A bushing comprising two concentric shells, one of which is provided with flanges, and a series of strips disposed longitudinally of the bushing axis and connected to said flanges; substantially as described.

16. A bushing comprising two concentric shells, one of which is provided with flanges, and a series of strips disposed longitudinally of the bushing axis and having interlocking connection with said flanges; substantially as described.

17. A bushing comprising two concentric shells, the inner one of which is provided with outwardly directed flanges, and a series of strips arranged longitudinally of the bushing axis and secured at their ends in said flanges; substantially as described.

18. A bushing comprising two concentric shells, the inner one of which is provided with outwardly directed flanges, and a series of strips arranged longitudinally of the bushing axis and having interlocking connection with said flanges; substantially as described.

19. A bushing comprising two concentric shells, the inner one of which is provided with outwardly directed end flanges and the outer one with inwardly directed flanges, and a series of strips arranged between said shells longitudinally thereof and secured to the flanges of the inner shell; substantially as described.

20. A bushing comprising two concentric shells, the inner one of which is provided with outwardly directed end flanges and laterally directed marginal flanges, and a series of strips arranged between said shells longitudinally thereof and secured to the end flanges of the inner shell; substantially as described.

21. A bushing comprising two concentric shells, the inner one of which is provided with outwardly directed end flanges and laterally directed marginal flanges, and the outer one provided with marginal flanges folded beneath the corresponding flanges of the inner shell, and a series of strips arranged between said shells longitudinally thereof and secured to said end flanges; substantially as described.

22. A bushing comprising two concentric shells, the inner one of which is provided with outwardly directed end flanges and laterally directed marginal flanges, and the outer one provided with marginal flanges folded beneath the corresponding flanges of the inner shell and also provided with inwardly directed end flanges overlapping the end flanges of the inner shell, and a series of strips arranged between said shells longitudinally thereof and secured to said end flanges of the inner shell; substantially as described.

23. A bushing comprising two concentric shells, the inner one of which is provided with outwardly directed end flanges and laterally directed marginal flanges, and the outer one provided with marginal flanges folded beneath the corresponding flanges of the inner shell and also provided with inwardly directed end flanges overlapping the end flanges of the inner shell, and a series of strips arranged between said shells longitudinally thereof and having projecting end lugs, said end flanges of the inner shell having slots to receive said lugs; substantially as described.

24. A bushing comprising two concentric shells, the inner one of which is provided with outwardly directed end flanges and laterally directed marginal flanges, and the outer one provided with marginal flanges folded bedeath the corresponding flanges of the inner shell, and a series of strips arranged between said shells longitudinally thereof, said end flanges having a series of slots to receive the ends of the strips and thereby form interlocking connection therewith; substantially as described.

25. A bushing comprising a shell, and a series of separate independent bars or strips separate from each other, said strips being arranged longitudinally of the shell and connected therewith; substantially as described.

HENRY J. GILBERT.

Witnesses:
   H. MEAD HAMMOND,
   ARNOLD BOUTELL.